Figure 1:
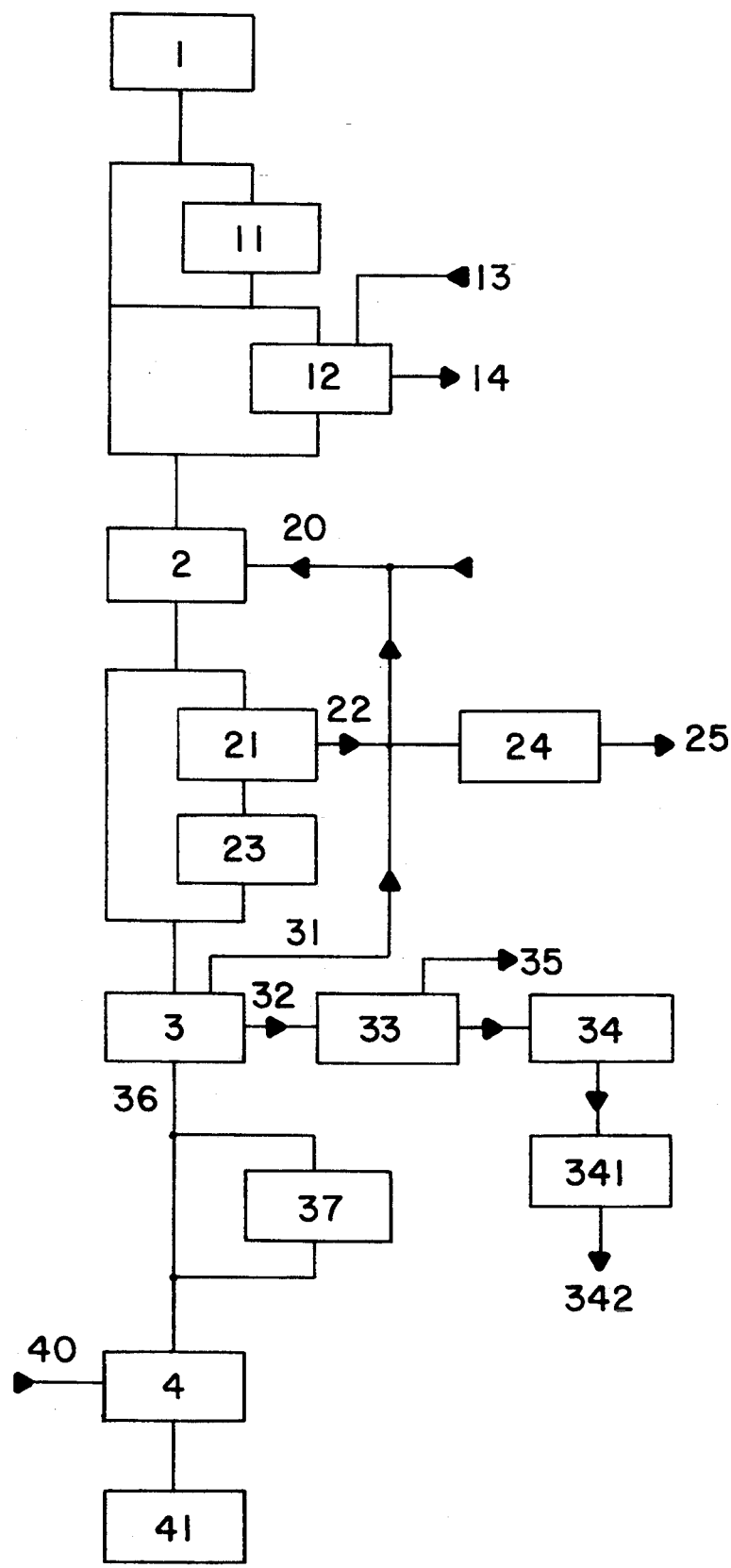

United States Patent [19]

Gabriac et al.

[11] Patent Number: 5,431,891
[45] Date of Patent: Jul. 11, 1995

[54] PROCESS FOR THE RECOVERY AND PURIFICATION OF A METAL ALLOY BASED ON HIGHLY ENRICHED URANIUM

[75] Inventors: Andre Gabriac, La Garde Adhemar; Airy-Pierre Lamaze, Grenoble; Roger Durand, Le Vesinet; Rene Romano, Paris, all of France

[73] Assignee: Companie Generale des Matieres Nucleaires, Velizy-Villacoublay, France

[21] Appl. No.: 14,529

[22] Filed: Feb. 8, 1993

[30] Foreign Application Priority Data

Feb. 11, 1992 [FR] France ............................ 92 01730
Jun. 5, 1992 [FR] France ............................ 92 07157

[51] Int. Cl.6 ............................................. C01G 43/00
[52] U.S. Cl. ................................ 423/19; 423/259; 423/258
[58] Field of Search ................... 423/19, 259, 258; 252/627, 630; 976/DIG. 279

[56] References Cited

U.S. PATENT DOCUMENTS

| | | | |
|---|---|---|---|
| 2,750,253 | 6/1956 | Smith | 23/14.5 |
| 3,708,568 | 2/1973 | Golliher et al. | 423/6 |
| 3,714,324 | 1/1973 | Weech | 23/341 |
| 3,720,748 | 3/1973 | Massonne | 423/258 |
| 3,796,672 | 3/1974 | Dada et al. | 252/301.1 R |
| 3,843,766 | 11/1974 | Anderson et al. | 423/11 |
| 4,003,980 | 1/1977 | Watt et al. | 423/261 |
| 4,012,489 | 3/1977 | Watt et al. | 423/261 |
| 4,053,559 | 10/1977 | Hart et al. | 423/261 |
| 4,202,861 | 5/1980 | Bourgeois et al. | 423/19 |
| 4,234,550 | 11/1980 | DeHollander | 423/261 |
| 4,294,598 | 10/1981 | Gazda | 55/403 |
| 4,769,180 | 9/1988 | Echigo et al. | 252/631 |
| 5,284,605 | 2/1994 | Nicolas | 252/630 |

FOREIGN PATENT DOCUMENTS

| | | |
|---|---|---|
| 2068738 | 9/1971 | France . |
| 981044 | 1/1965 | United Kingdom . |
| 1198454 | 7/1970 | United Kingdom . |

*Primary Examiner*—Donald P. Walsh
*Assistant Examiner*—Meena Chelliah
*Attorney, Agent, or Firm*—Dennison, Meserole, Pollack & Scheiner

[57] ABSTRACT

Process for the treatment of a metal alloy based on uranium, generally in highly enriched form and other metallic elements, comprising a fluorination treatment with the aid of at least one fluorine-containing gas, optionally with an intermediate fluorination with the aid of a fluoric compound, a distillation treatment of the gaseous fluoride flow obtained in order to obtain pure uranium hexafluoride, as well as a mixing treatment of said hexafluoride with another more depleted hexafluoride to obtain the desired final isotopic content.

14 Claims, 2 Drawing Sheets

PROCESS FOR THE RECOVERY AND PURIFICATION OF A METAL ALLOY BASED ON HIGHLY ENRICHED URANIUM

TECHNICAL FIELD

The invention relates to a process for the treatment of a metal alloy based on highly enriched uranium in order to recover therefrom uranium in the form of a pure uraniferous compound with a lower controlled isotopic content by a dry fluoride route.

SET PROBLEM

Metal alloys are available based on uranium highly enriched with U235 and generally containing significant percentages of addition elements of the type Mo, Nb, Fe, Cr, Ni, Si, Al, Zr, Ta, W . . . Highly enriched is understood to mean ratios of U235 to total U generally exceeding 8%, but which can reach or even exceed 90%. They can e.g. be U—Si alloys obtained from MTR-type research reactors at the most 2% enriched with U—Al alloys, alloys for military uses, etc. These alloys may be non-irradiated (e.g. waste, obsolete alloys, etc.) or irradiated.

It is of interest to be able to recover the U235 potential contained in order to use it e.g. in less enriched and purified form as a fuel in power nuclear reactors, e.g. of the PWR or BWR type, or in research reactors.

For this purpose, the Applicant has investigated a process for the treatment of these metal alloys making it possible to obtain a pure uraniferous compound having a homogeneous U235 isotopic content and adapted to the novel use differing from that of the starting product, as well as a chemical composition and quality such that it is possible to use it in simple manner in the production of the desired fuel in existing installations provided for this use. The chemical compound must in particular be very pure and be perfectly homogeneous.

DESCRIPTION OF THE INVENTION

The invention relates to a process for the treatment of a metal alloy based on uranium and preferably highly enriched with U235 and other metallic elements comprising:

a) a fluorination treatment of the alloy by at least one fluorine-containing gas in order to recover on the one hand a gaseous mixture containing uranium and other elements of the alloy in the form of gaseous fluorides able to contain oxyfluorides when oxygen is present in the starting alloy with non-condensable gases, and on the other hand a non-volatile, fluoric or unburned solid residue, b) a distillation treatment of said gaseous mixture in order to separately recover pure uranium hexafluoride from the fluorides of the other elements, c) a mixing operation for said highly enriched, pure uranium hexafluoride in liquid or gaseous form with a less enriched uranium hexafluoride in proportions such that the different U235 isotopic content is obtained in the resulting mixture and at the desired value.

The starting metal alloy generally contains high proportions of alloy elements such as Mo, Nb, Fe, Cr, Ni, Si, Al, Zr, Ta, W, Pu, etc. Its fluorination takes place in solid or divided form and said division being obtainable from solid pieces or ingots by any known procedures, e.g. sawing, grinding, cryogenic grinding, etc. materially adapted to the control of the criticality.

Fluorination can take place in one or two stages. In one stage it takes place with the aid of gaseous fluorine, the exothermic reaction being controlled by the introduction of a generally non-condensable diluting inert gas (e.g. nitrogen, argon, etc.). On the one hand a gaseous mixture is obtained containing non-condensable gases (mainly the inert diluting gas), gaseous fluorides and optionally oxyfluorides (highly enriched uranium and alloy elements giving volatile fluorides at the fluorination reaction temperature) and on the other hand a solid residue constituted by impurities in the form of unburned products and fluorides in non-volatile form and which is optionally treated prior to discharge. It can also take place in two stages, whereby in the first stage the uranium is transformed into $UF_4$ and part of the metallic elements of the starting alloy into fluoride with the aid of a gaseous and non-polluting compound with respect to the fluorine, and a second stage where the fluorination of the solid obtained during the first stage is completed with the aid of a fluorine-based gas under conditions identical to those of the one-stage fluorination.

The fluorination in two stages can take place in two different ways. In a first way, the first stage is carried out by contacting the starting alloy with gaseous anhydrous hydrofluoric acid in order to obtain volatile fluorides, which are to be eliminated after separation, e.g. by filtration, condensation and/or neutralization treatment and a solid residue mainly constituted by solid fluorides (whereof all the U is in $UF_4$ form) and a second stage where said solid residue is treated by gaseous fluorine under conditions identical to those of one-stage fluorination, as stated. In a second way, the first stage is performed by contacting the starting uraniferous alloy with a fluorine-containing gas based on $UF_6$ and which is generally more U235 depleted, in order to transform all or part of the U into $UF_4$ and at least partly fluorinate the other metallic constituents of the starting alloy. In the second stage, the previously obtained solid is contacted with fluorine, optionally diluted with an inert gas, in order to obtain, as was described in connection with the one-stage fluorination, on the one hand the mixture of gaseous fluoride and non-condensable gases and on the other the non-volatile, unburned residue.

The U is transformed according to the following reactions:

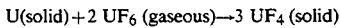

$$U\text{(solid)} + 2\ UF_6\text{ (gaseous)} \rightarrow 3\ UF_4\text{ (solid)}$$

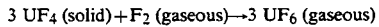

$$3\ UF_4\text{ (solid)} + F_2\text{ (gaseous)} \rightarrow 3\ UF_6\text{ (gaseous)}$$

In this second way, it is possible to operate in a single reactor operating in countercurrent manner. Thus, at one end of the reactor introduction takes place of the metallic alloy preferably in pieces, in an intermediate section of the reactor more depleted gaseous $UF_6$ is introduced and at the other end the fluorine-based gas, the mixture of gaseous fluorides and non-condensable gases being discharged at the metal alloy introduction end.

This second way has several advantages. As fluorination takes place in two stages with the intermediate obtaining of $UF_4$ with the aid of combined fluorine ($UF_6$), the control of the reaction temperature is greatly facilitated and improved, a similar advantage being obtained with the first way where HF is used. As from this stage of the process, use is made of an isotopic mixture for lowering the isotopic content of the U, it is possible to limit the criticality problems in the remainder of the process and therefore considerably simplify the problems relating to the dimensioning and the regulations governing the installations.

The gaseous flow resulting from the treatment by fluorine is generally filtered and condensed and is generally brought into a liquid state and stored in an intermediate container, where the liquid state is generally maintained. During this condensation, the non-condensable gases are separated.

Condensation can take place cold in one or more successive crystallizers kept under pressures of approximately 1 bar and at very low temperatures of normally approximately $-25°$ C., in order to eliminate all traces of U fluoride in the non-condensable gases. These gases are mainly constituted by a mixture of excess fluorine, diluting gas (nitrogen, argon, etc.) or non-condensable fluorides (e.g. $SiF_4$). They can be discharged following an optional passage into a reducing column and/or a safety filter. However, they can also be recycled to the fluorination stage, provided that they do not contain non-condensable gaseous fluorides, so that in this case less advanced crystallization and treatment of said gases are necessary.

The purification treatment by the distillation of the mixture of fluoride stored in the intermediate container is carried out in one or more successive distillation columns, as a function of the complexity of the mixture to be treated. These columns are generally packed columns, but can also be plate columns. They are generally equipped with a reflux condenser located at the top of the column and a reboiler or vaporizer at the bottom of the column, the fluoride mixture to be treated being introduced, generally in the liquid state, at an intermediate level.

For example, a single column is sufficient when there is a binary mixture of $UF_6$ and only one other impurity fluoride. In this case, by regulating the reflux levels of the condenser and the reboiler, it is possible to obtain pure $UF_6$ either at the column top or bottom as a function of whether the other fluoride is respectively less volatile (heavier) or more volatile (lighter) than $UF_6$.

However, when there is a complex mixture containing, apart from the $UF_6$, a complex mixture of volatile impurity fluorides, it is advantageous to operate with several successive columns. In a first column the aid is to recover all the $UF_6$ at the top of the column, where it is mixed with other lighter fluorides, said $UF_6$ then being separated from the heavier fluorides recovered at the bottom of the column.

Into the second column is introduced the mixture of $UF_6$ and the light fluorides and pure $UF_6$ is recovered at the bottom of the column, whilst eliminating the lighter fluorides at the top of the column. The performance order of these two distillation operations can be reversed.

In each column, the reflux level of the condenser and the level of the reboiler are regulated so as to achieve the sought purity. It is possible to use supplementary columns in order to separate the metal fluorides from one another when they can be volatilized.

After the distillation treatment, there is consequently the residue obtaining of pure $UF_6$ and the various other fluorides in liquid form. At the top of the condensers, separation and recovery has also taken place of the non-condensable gases at the column top temperature and in small quantities and which are generally discharged after treatment, but which can also be recycled if their composition is suitable.

The other fluorides (other than $UF_6$), once solidified, can be stored as they are, but are preferably treated, generally hydrolyzed in order to obtain on the one hand HF, which can then be volatilized, and on the other hand the metals of the initial uraniferous alloy in the form of more easily storable, handleable and volatilizable oxides, which can then be reduced by hydrogen if it is wished to obtain the metals of the uraniferous alloy.

The pure $UF_6$ obtained after the purification treatment is in liquid form. It can then be mixed in this form or in gaseous form with a dosed pure $UF_6$ flow (generally more depleted of U235), in gaseous or liquid form, in order to obtain the desired U235 isotopic content. Obviously, the dosed flow is a function of the respective U235 contents of the $UF_6$ to be mixed and the content to be obtained. The more depleted $UF_6$ can advantageously be based on highly depleted uranium (0.2% U235), of which there are large stocks, or based on depleted or natural uranium.

The mixture formed on the basis of $UF_6$ in liquid or gaseous form has the advantage of simplicity and giving a $UF_6$ having a perfect isotopic and chemical homogeneity. After mixing the resulting, pure $UF_6$ with the desired isotopic content, it is condensed, poured into a container for transportation, storage or use in the conventional manner.

As a variant, the fluorination stage can be preceded by an alloy oxidation stage carried out in a furnace with the aid of an oxygen-based gas, optionally diluted in order to moderate the reaction if need be. Such an operation is advantageous when the starting alloy contains metals liable to lead to volatile oxides, which are then separated easily from the non-volatile oxides during the operation and are condensed separately. Thus, there is a preliminary purification which facilitates the subsequent and already described marked purification by fractional distillation. This oxidation stage is particularly interesting when the starting alloy contains Mo or a metal of the same type.

The thus recovered solid oxides, including $U_3O_8$, are then treated in the fluorination stage giving, as stated hereinbefore, volatile fluorides, optionally oxyfluorides, non-condensable gases (including oxygen from the oxides) and unburned solid residues.

DRAWINGS

FIG. 1 shows the different stages of the process showing the main optional variants:

(1) the alloy in solid form,

(11) the reduction in divided form of the alloy,

(12) the prior oxidation variant with respect to the alloy in solid or divided form, using more or less diluted oxygen (13), with possible separation of volatile oxides in (14), (2) the fluorination of the alloy, in solid or divided form, or the oxide, with the aid of a gas (20) containing fluorine and generally noncondensable inert gases, as stated hereinbefore said fluorination can be carried out in two stages obtaining an intermediate $UF_4$ with the aid of combined fluorine (HF or $UF_6$),

(21) the condensation of the volatile fluorides obtained in (2) with separation of the non-condensable gases (22), at least partly recycled in (20) and/or treated in (24), e.g. by filtration and/or washing, prior to discharge (25),

(23) the reheating of the fluorides condensed in (21), (3) fractional distillation making it possible to purify $UF_6$ and carried out in one or more columns,

(31) the separation of any non-condensable gases if they have not been separated beforehand, which can be recycled in (20) and/or treated in (24) prior to discharge (25),

(32) the separate multiple outlets for the different fluorides of the elements of the alloy other than uranium, which can be treated in (33), generally by hydrolysis, in order to obtain elements in oxide form in (34) and hydrofluoric acid in (35), followed by reduction by hydrogen in (341) to obtain the metals of the alloy (342),

(36) the pure $UF_6$ outlet, generally in liquid form,

(37) the reheating of $UF_6$ to bring it into gaseous form, (4) the mixing of pure $UF_6$ in liquid or gaseous form with a more depleted $UF_6$ (40) in liquid or gaseous form and in a dosed quantity,

(41) the condensation and pouring into a container of the final $UF_6$ with the desired isotopic content.

Figure 2A:
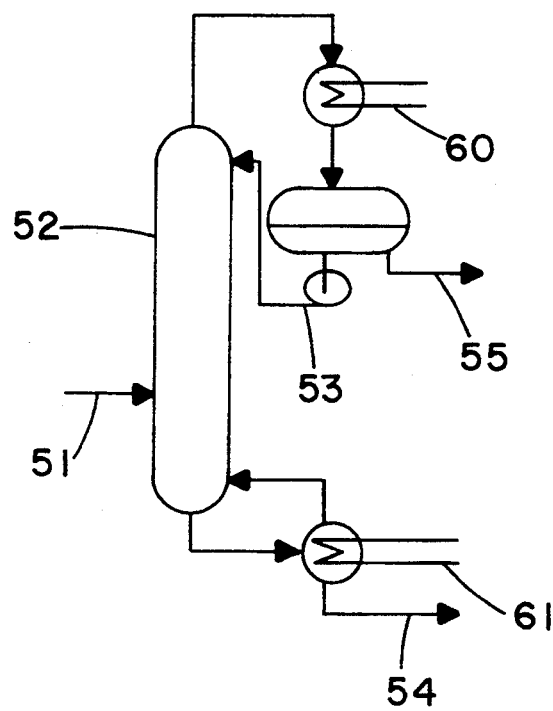
Figure 2B:
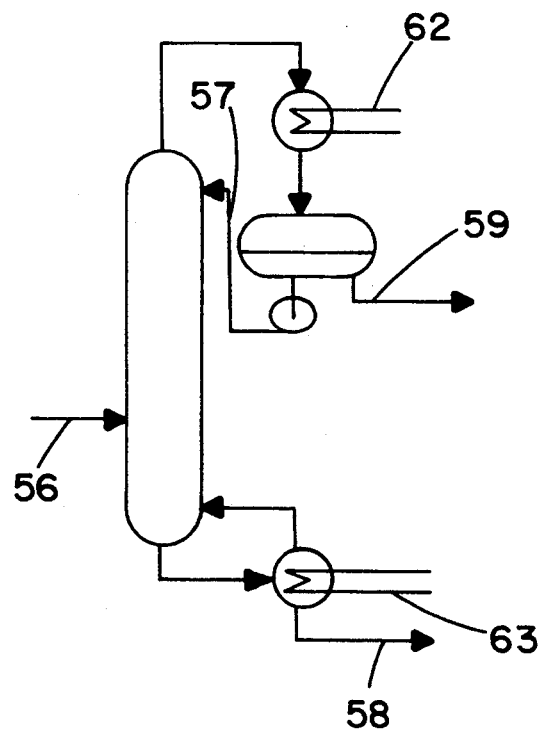

FIGS. 2A and 2B show the fractional distillation (3 in FIG. 1) comprising two successive columns and used in example 1.

EXAMPLES

The following examples serve to illustrate the invention and use as the starting product natural uranium alloys in examples 1 and 2, (but the latter can be transposed under the same conditions to enriched U) and on the basis of highly enriched uranium alloy in example 3.

Example 1

The starting product is constituted by a batch of alloy fragments of average analysis 5% Nb, 5% Mo, 1% Ti, 1% Fe, 0.1% Ni, the remainder being natural uranium with 0.7% U235. It was ground in order to obtain a grain size between 1.5 and 25 mm. It was continuously fluorinated in a Monel reactor with an external diameter of 88.9 mm, a thickness of 3.05 mm and provided with a thermostatic fluid cooling system. The fluorine flow rate was 455 g/h under an absolute pressure of 1.2 bar and to which was temporarily added $N_2$ in order to maintain the reactor wall temperature at 320°±30° C.

Under these conditions, the nitrogen flow rate varied between 0 and 100% and mainly between 40 and 70% of the total flow rate.

The resulting gaseous fluorides were integrally collected in a crystallizer under an absolute pressure of 0.5±0.1 bar, cooled to −25° C. with the aid of freon 113, in order to obtain a mixture of fluorides in crystalline form. The separated non-condensable gases were washed and neutralized by an alkaline KOH solution.

The mixture of crystallized fluorides contains all the uranium, molybdenum and niobium respectively in the form $UF_6$, $MoF_6$ and $NbF_5$, together with traces of $TiF_4$.

All the iron and nickel and 95% of the titanium were collected in fluoride form at the base of the fluorination reactor.

The material balance reveals the following yields:

Yield: U recovered in the form of crystallized $UF_6$/U of the starting alloy substantially equal to 100%

Yield: fluorine contained in the solid or crystallized fluorides/fluorine used in the reaction equal to 95%.

After intermediate storage in a buffer container, the crystallized fluorides were melted in order to continuously introduce them into the distillation cycle constituted by two successive columns. They were introduced under 3.3 bar absolute in the lower ⅓ of a Monel packed column (diameter 55 mm, height 1200 mm) at a continuous flow rate of 4.977 kg/h, i.e. 1.3 l/h, for an average composition of (51) of 4.300 kg/h of $UF_6$ contained, 0.352 kg/h of $MoF_6$ contained, 0.325 kg/h of $NbF_5$ contained and a trace of $TiF_4$.

The thermal equilibrium was maintained at 92° C. in the centre of the column (52) for a reflux flow (53) of 8 l/h and a drawing off flow at the base (54) of 0.19 l/h, (60) and (62) representing cooling coils and (61) and (63) heating coils.

Under 3.2 bars, collection took place at the head of the column of the mixture (55) constituted by 4.077 kg/h of $UF_6$ and 0.352 kg/h of $MoF_6$ and at the base of the column a mixture containing 0.325 kg/h of $NbF_5$, 0.223 kg/h of $UF_6$ and traces of $TiF_4$.

The top mixture (55), which can be cyclically reprocessed by appropriate distillation in order to separate Nb and U, was introduced into the lower ⅓ (56) of the second column of the same type (diameter 40 mm, height 2400 mm) under 3.2 bar absolute and 87° C.

The reflux and drawing off rates were respectively reflux (57): 34 l/h, drawing off at the bottom (58): 1.14 l/h i.e. $UF_6$: 4.069 kg/h, drawing off at the top (59): 0.12 l/h, i.e. $MoF_6$: 0.3532 kg/h and $UF_6$: 0.002 kg/h.

The column base $UF_6$ was collected in a 25 kg container. Its average analysis in % by weight based on uranium was: Mo<1 ppm, Nb<1 ppm, Fe<0.5 ppm, Ti<0.5 ppm, Ni<0.5 ppm.

To the 25 kg was added in the liquid state and at 75° C., 6.25 kg of pure $UF_6$ containing 0.25% of U235, preheated in a contained also at 75° C. The mixture obtained of 31.25 kg had an isotopic content of 0.61% U235 and was perfectly homogeneous.

Example 2

This example illustrates the two-stage fluorination with the aid of a fluorine-containing compound ($UF_6$) of a starting alloy of type $U_3Si_2$. The latter is in the form of a powder with a grain size below 150 μm and has a weight composition of U 92.6%, Si 7.3% and A 10.1%. This powder represents what can be obtained from a research fuel based on $U_3Si_2$ initially contained in an Al matrix and which has previously been eliminated by basic etching or any other equivalent process.

As in the preceding example, for practical reasons use was made of natural U (0.7% U235). Working took place in a fluorination reactor identical to that of example 1. However, bearing in mind the powder division state, use was made of a powder supply system protected by argon scavenging.

At the head of the reactor 770 g/h of pulverulent alloy were introduced, in the centre of the reactor 2112 g/h of highly depleted $UF_6$ (0.3% U235) and at the bottom of the reactor 516 g/h of fluorine with a HF content <100 ppm, diluted to a greater or lesser extent by Ar in order to control the temperature.

The pressure and temperature conditions in the reactor were identical to those of example 1.

At the head of the reactor was recovered a gaseous mixture containing 22 g/h fluorine and dilution argon, 3168 g/h of $UF_6$ with an isotopic content 0.43% of U235 and 208 g/h of $SiF_4$. In addition, solid unburnt products constituted by AUF were recovered.

The gaseous flow was cooled to −25° C. Thus, all the UF$_6$ was condensed and vent gases containing the excess fluorine and all the SiF$_4$ (208 g/h).

Degassing of the crystallized UF$_6$, under a reduced pressure and whilst maintaining a constant temperature level, made it possible to obtain UF$_6$ containing less than 1 ppm of Si and less than 20 ppm HF.

Example 3

The starting product was constituted by an irradiated fuel alloy fragment batch of the type U$_3$Si$_2$ on the basis of average enriched uranium (20% U235) contained in an aluminium matrix. The starting product was cut up and ground in order to obtain a grain size between 5 and 25 mm.

The composition of the product was substantially as follows (by weight):
Uranium: 80%
Silicium: 3%
Fission product (FP): 7%
Aluminium: 10%

The most significant FP were Pu, Mo, Nb, Ti, Ru and Mg.

The product was firstly continuously treated in a Monel reactor of internal diameter 80 mm with a gaseous HF flow of 450 g/h diluted by a continuous flow of 500 g/h of N$_2$. The temperature was maintained at 400° C. and the reactor pressure at 10$^2$ KPa.

The resulting volatile fluorides were filtered, whereas the non-volatile fluorides, including UF$_4$ remaining in the reactor were continuously fluorinated at 350° C. under a pressure of 10$^2$ KPa. The fluorine flow rate was 150 g/h diluted by 500 g/h of N$_2$.

The volatile fluorides were filtered on a metal packed column, which made it possible to eliminate the entrained non-volatile fluorides and also the Pu in solid PuF$_4$ form as a result of the decomposition of unstable gaseous PuF$_6$. They were then cooled in a condenser maintained at −20° C. and in which UF$_6$ had been crystallized. The pressure was 10$^2$ KPa.

The non-condensable gases, mainly F$_2$, O$_2$, N$_2$, were filtered and treated on a lime absorber. After degassing in vacuo for a few hours, the condenser was heated to 90° C. and the liquid UF$_6$ underwent two successive distillation operations.

In the first column, recovery took place at the bottom of the column of the heavy products such as NbF$_5$ and the possible traces of PuF$_6$. In the second column, recovery took place at the top of a few dozen grams of MoF$_6$ and at the bottom of pure UF$_6$. The activity of the thus obtained UF$_6$ was below $2 \times 10^{-7}$ µCi/g of U and the content of ordinary metal impurities was <50 ppm, including Mo<1 ppm.

This gaseous UF$_6$ was then introduced by bubbling at a rate of 14.5% into a natural UF$_6$ container in order to obtain perfectly homogeneous UF$_6$ enriched with 3.5% U235 and intended for obtaining fuel according to known procedures.

Thus, the process according to the invention leads to a very homogeneous, pure, final UF$_6$, more particularly with respect to the U235 content. It makes it possible to recover the impurities contained in the initial alloy in condensed form and thus generates no liquid effluent more particularly containing said impurities in dilute form and which would have to be treated prior to discharge. It also makes it possible to limit the criticality problems, bearing in mind the absence of an aqueous phase.

We claim:

1. Process for the treatment of a uranium-based metal alloy, comprising the steps of:
   a) fluorinating the alloy with at least one fluorine-containing gas to obtain a gaseous mixture comprising uranium hexafluoride, fluorides of other metallic alloy elements and non-condensable gases, and a non-volatile solid residue;
   b) distilling said gaseous mixture to separate uranium hexafluoride in substantially pure form from fluorides of the other metallic elements; and
   c) mixing said substantially pure uranium hexafluoride in liquid or gaseous form with uranium hexafluoride of lower enrichment to obtain uranium hexafluoride of desired isotopic content.

2. Process according to claim 1, wherein the metal alloy is brought into divided form before fluorination.

3. Process according to claim 1, wherein the metal alloy is treated by an oxygen-based gas prior to fluorination, in order to obtain solid oxides, including U$_3$O$_8$, and oxides in gaseous form which are separated.

4. Process according to any one of the claims 1, 2 or 3, wherein the distillation is preceded by a stage including the condensation of the gaseous fluorides, the subsequent separation of the non-condensable gases and the restoring to liquid or gaseous form of the fluorides.

5. Process according to any one of the claims 1, 2 or 3, wherein fluorination takes place in one stage utilizing gaseous fluorine diluted by an inert gas.

6. Process according to any one of the claims 1, 2 or 3, wherein fluorination is performed in two stages, a first stage in which the alloy is treated with combined fluorine to obtain a solid containing uranium in UF$_4$ form and a second stage in which said solid is treated by a fluorine-based gas.

7. Process according to claim 6, wherein during the first stage the alloy is treated with gaseous anhydrous HF.

8. Process according to claim 6, wherein during the first stage the alloy is treated by gaseous UF$_6$ more depleted of U235 than the U of the starting alloy.

9. Process according to any one of the claims 1, 2 or 3, wherein the distilling is carried out with at least one distillation column, incorporating a condenser and a reflux reboiler respectively connected to the top and bottom of aid at least one column.

10. Process according to any one of the claims 1, 2 or 3, wherein the non-condensable gases are separated from the condensed fluorides and are recycled to the fluorination stage.

11. Process according to any one of the claims 1, 2 or 3, wherein the fluorides of the other metallic elements are separated from one another by distillation.

12. Process according to any one of the claims 1, 2 or 3, the fluorides of the other metallic elements are treated for transformation into oxide and then into metal.

13. Process according to claim 1, wherein oxygen is present in said alloy, and said gaseous mixture comprises oxyfluorides.

14. Process according to claim 9, wherein the distilling is carried out with two distillation columns.

* * * * *